United States Patent
Pai

(10) Patent No.: US 7,539,955 B2
(45) Date of Patent: May 26, 2009

(54) SYSTEM AND METHOD FOR REFORMATTING A MOTHERBOARD DESIGN FILE

(75) Inventor: Yu-Chang Pai, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 492 days.

(21) Appl. No.: 11/309,520

(22) Filed: Aug. 16, 2006

(65) Prior Publication Data
US 2007/0106961 A1    May 10, 2007

(30) Foreign Application Priority Data
Nov. 9, 2005    (CN) .................... 2005 1 0101224

(51) Int. Cl.
*G06F 17/50* (2006.01)
(52) U.S. Cl. ........................... 716/3; 716/15
(58) Field of Classification Search .............. 716/3–5, 716/15
See application file for complete search history.

(56) References Cited

U.S. PATENT DOCUMENTS 6,931,603 B2    8/2005    Boegelund
2006/0282811 A1*    12/2006    Fujimura .................... 716/15
2006/0294489 A1*    12/2006    Tai et al. .................... 716/15

FOREIGN PATENT DOCUMENTS

TW    571201    1/2004

\* cited by examiner

*Primary Examiner*—Paul Dinh
(74) *Attorney, Agent, or Firm*—Winston Hsu

(57) ABSTRACT

A method for reformatting a motherboard design file includes the steps of: converting the motherboard design file from a first format to a second format, and generating a converted temp file based on the motherboard design file; selecting information classes of the converted temp file; parsing contents from the converted temp file according to the information classes; data checking thickness of each layer according to thickness information of each layer; data checking circuit configuration of the motherboard according to information of pads and etching information of circuits; and encoding needed codes according to thickness of each layer and circuit configuration of the multilayer motherboard, and generating the motherboard design file based on the needed codes. A system for reformatting a motherboard design file is also disclosed.

6 Claims, 3 Drawing Sheets

SYSTEM AND METHOD FOR REFORMATTING A MOTHERBOARD DESIGN FILE

FIELD OF THE INVENTION

The present invention generally relates to systems and methods for reformatting a file, and more particularly to a system and method for reformatting a motherboard design file.

DESCRIPTION OF RELATED ART

There are currently a variety of techniques for reformatting digital documents such as, for example, text files, spreadsheets, processing documents, database files, electronic mail messages, and groupware documents as well as other files from their original file formats to other file formats such as, for example, the DXF format (drawing exchange file format).

To save time and effort in a motherboard development process, a designer usually use a software tool named Allegro to design the motherboard, and a software tool named ANSYS to analyze electromagnetic performance and heat exchange performance of the designed motherboard. The Allegro helps the designer design the motherboard by stopping at certain breakpoints and displaying various designing elements.

It is now recognized that a designer can directly reformat a motherboard design file BRD (board file) format, into a DXF file format that can be well identified by the ANSYS. However, after reformatting the BRD file format to the DXF file format, the resulting contents in the file with DXF file format is frequently different from contents of the BRD file source.

What is needed, therefore, is a system and method that convert format of a motherboard design file correctly.

SUMMARY OF THE INVENTION

A system for reformatting a motherboard design file in accordance with a preferred embodiment includes a storage device and a conversion module. The storage device is configured for storing the motherboard design file. The conversion module includes a conversion sub-module, a selecting sub-module, a parsing sub-module, a data checking sub-module, and a data formatting sub-module. The conversion sub-module is configured for converting the motherboard design file from a first format to a second format, and generating a converted temp file based on the motherboard design file. The selecting sub-module is configured for categorizing information classes of the converted temp file. The parsing sub-module is configured for parsing contents from the converted temp file according to the information classes. The data checking sub-module is configured for data checking thickness of each layer according to thickness information of each layer, data checking circuit configuration of the motherboard according to information of pads and etching information of circuits. The data formatting sub-module is configured for encoding needed codes according to the information confirmed by the data checking sub-module, and generating the motherboard design file based on the needed codes.

A method for reformatting a motherboard design file in accordance with a preferred embodiment includes the steps of: converting the motherboard design file from a first format to a second format, and generating a converted temp file based on the motherboard design file; selecting information classes of the converted temp file; parsing contents from the converted temp file according to the information classes; data checking thickness of each layer according to thickness information of each layer; data checking circuit configuration of the motherboard according to information of pads and etching information of circuits; and encoding needed codes according to thickness of each layer and circuit configuration of the multilayer motherboard, and generating the motherboard design file based on the needed codes.

Other advantages and novel features of the present invention will become more apparent from the following detailed description of preferred embodiments when taken in conjunction with the accompanying drawings.

DETAILED DESCRIPTION OF THE INVENTION

In a preferred embodiment, an Allegro BRD formatted file of a multilayer motherboard is to be converted into an ANSYS readable file.

Figure 1:
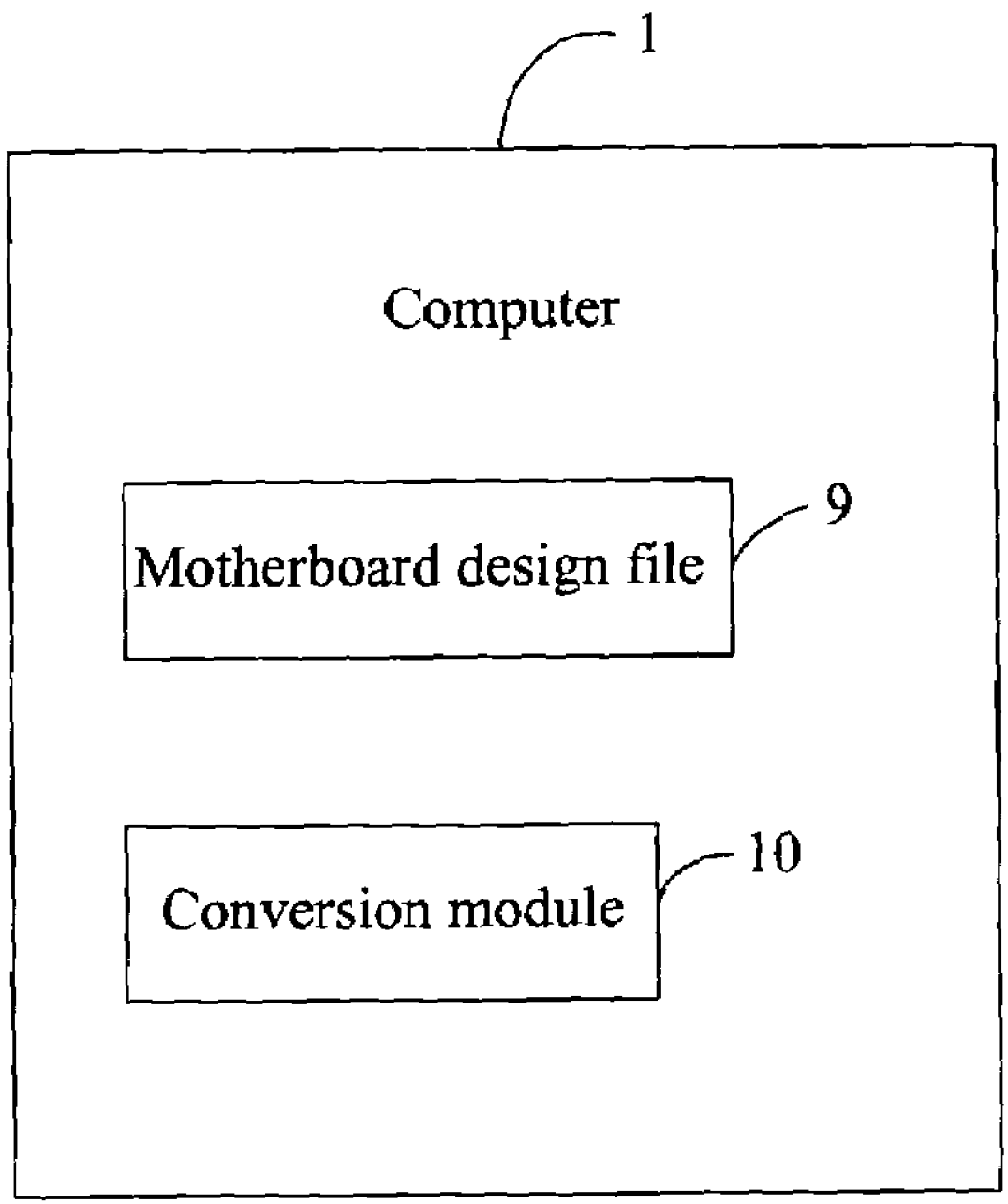
FIG. 1 is a schematic diagram of a system for reformatting a motherboard design file in accordance with a preferred embodiment.

FIG. 1 is a schematic diagram of a system for reformatting the Allegro BRD formatted file in accordance with the preferred embodiment. The system is implemented in a computer 1. The computer 1 typically includes a central processing unit (CPU) (not shown), a storage device (not shown) configured for storing the Allegro BRD formatted file 9, and a conversion module 10 configured for reformatting the Allegro BRD formatted file 9.

Figure 2:
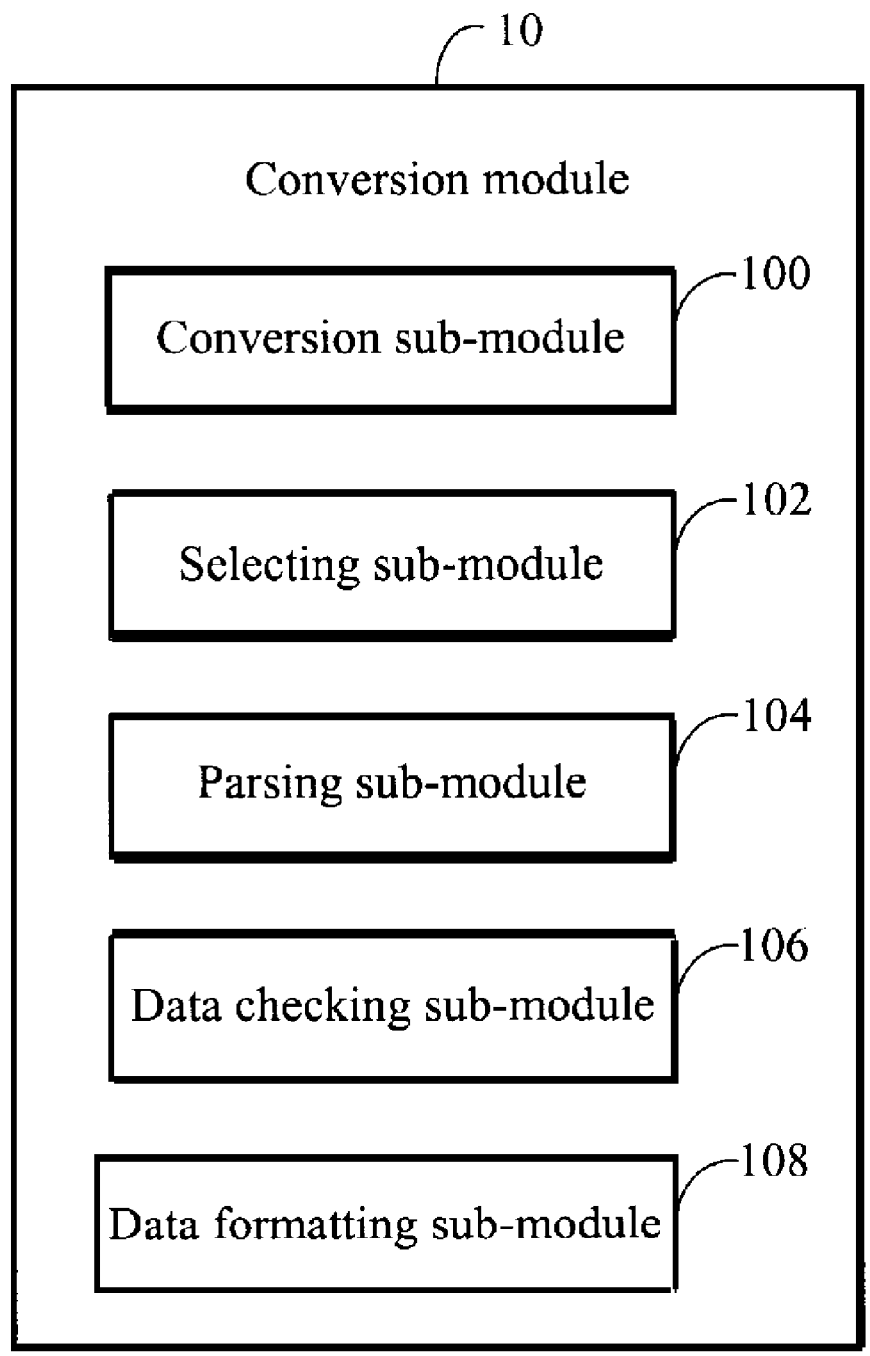
FIG. 2 is a schematic diagram of the converting module of the system of FIG. 1.

FIG. 2 is a schematic diagram of the conversion module 10 of the system of FIG. 1. The conversion module 10 typically includes a conversion sub-module 100, a selecting sub-module 102, a parsing sub-module 104, a data checking sub-module 106, and a data formatting sub-module 108.

The conversion sub-module 100 is configured for converting the Allegro BRD formatted file 9 to an American standard code for information interchange (ASCII) file, and generating a converted temp file.

The selecting sub-module 102 is configured for categorizing information classes of the converted temp file. The information classes are mandatory in a motherboard design, and typically include thickness information of each layer, information of pads, etching information of circuits, information of components, and linkage definition information of components.

The parsing sub-module 104 is configured for parsing contents from the converted temp file according to the information classes categorized by the selecting sub-module 102. In other words, the parsing sub-module 104 is configured for identifying and classifying contents from the converted temp file according to the information classes. In the preferred embodiment, the parsing sub-module 104 parses contents from the converted temp file by way of keyword searching. For example, "a thickness unit" of each layer can be regarded as a keyword. The parsing sub-module 104 parses thickness information of each layer from the converted temp file according to the keyword, and classifies the parsed contents into corresponding information classes.

The data checking sub-module 106 is configured for data checking thickness of each layer according to thickness information of each layer, data checking circuit configurations of the motherboard according to information of pads and etching information of circuits, and for data checking via configurations and via anti-pad configurations according to information of components and linkage definition information of components.

The data formatting sub-module 108 is configured for encoding parametric design language codes of the analyzing software named ANSYS on the information confirmed by the data checking sub-module 106, in order to set the geometric configuration of multilayer motherboard circuits, and for generating the ANSYS readable file. In other words, the data formatting sub-module 108 is configured for encoding the information confirmed by the data checking sub-module 106 into parametric design language codes of the ANSYS. Furthermore, the data formatting sub-module 108 is configured for configuring a model in order to simulate vias and the connection correlations between vias and each layer.

Figure 3:
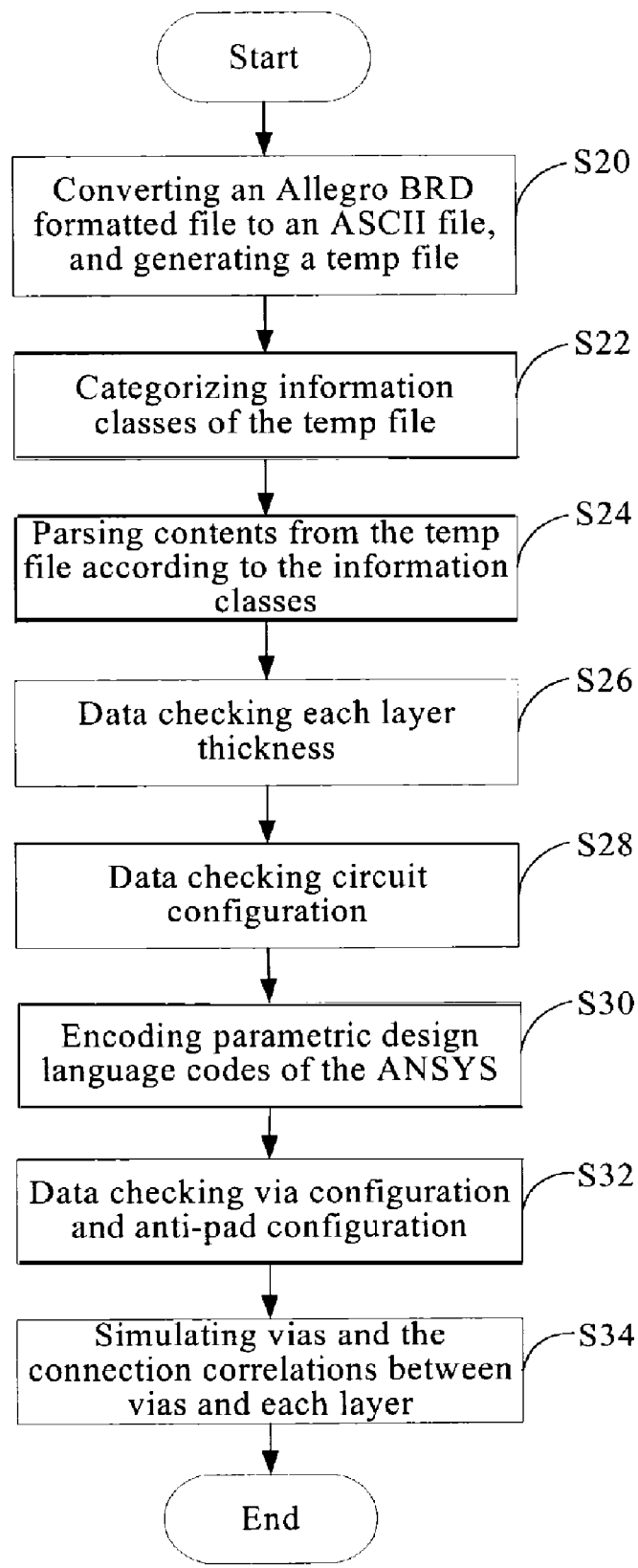
FIG. 3 is a flowchart of a method for reformatting a motherboard design file in accordance with a preferred embodiment.

FIG. 3 is a flowchart of a method for reformatting the Allegro BRD formatted file in accordance with a preferred embodiment. The system may be used to convert the Allegro BRD formatted file 9 of a multilayer motherboard to an ANSYS readable file. In step S20, the central processing unit (CPU) of the computer 1 activates the conversion sub-module 100. The conversion sub-module 100 converts the Allegro BRD formatted file 9 to an American standard code for information interchange (ASCII) file, and generates a converted temp file.

In step S22, the CPU activates the selecting sub-module 102 and the parsing sub-module 104. The selecting sub-module 102 categorizes information classes of the converted temp file. In step S24, the CPU activates the parsing sub-module 104. The parsing sub-module 104 parses contents from the converted temp file according to the categorized information classes. In the preferred embodiment, the categorized information classes typically include thickness information of each layer, information of pad, etching information of circuits, information of components, and linkage definition information of components.

In step S26, the CPU activates the data checking sub-module 106. The data checking sub-module 106 data checks each layer thickness according to thickness information of each layer.

In step S28, the data checking sub-module 106 data checks circuit configuration of the multilayer motherboard according to information of pads and etching information of circuits. The circuit configuration of the multilayer motherboard typically includes wiring traces of circuits, copper surfaced shape of each layer, void space of circuits and number of each layer circuits.

In step S30, the CPU activates the data formatting sub-module 108. The data formatting sub-module 108 encodes parametric design language codes of the ANSYS according to the information data checked by the data checking sub-module 106, in order to set geometric configuration of each layer circuits according to each layer thickness and the circuit configuration, and generates the ANSYS readable file.

In step S32, the data checking sub-module 106 data checks via configuration and anti-pad configuration according to information of components and linkage definition information of components.

In step S34, the data formatting sub-module 108 configures a model (for example, a cylinder) in order to simulate vias and the connection correlations between vias and each layer.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for reformatting a motherboard design file, the system comprising a storage device configured for storing the motherboard design file, and a conversion module configured for reformatting the motherboard design file, the conversion module comprising:
 a conversion sub-module configured for converting the motherboard design file from a first format to a second format, and generating a converted temp file based on the motherboard design file;
 a selecting sub-module configured for categorizing information classes of the converted temp file;
 a parsing sub-module configured for parsing contents from the converted temp file according to the information classes;
 a data checking sub-module configured for data checking thickness of each layer according to thickness information of each layer, data checking circuit configuration of the motherboard according to information of pads and etching information of circuits; and
 a data formatting sub-module configured for encoding needed codes according to the information confirmed by the data checking sub-module, and generating the motherboard design file based on the needed codes, wherein the information classes comprise thickness information of each layer, information of pads, etching information of circuits, information of components, and linkage definition information of components,
 wherein the data checking sub-module is further configured for data checking via configuration and anti-pad configuration according to information of components and linkage definition information of components, and
 wherein the data formatting sub-module is further configured for configuring a model to simulate vias and the connection correlations between vias and each layer according to via configuration and anti-pad configuration.

2. The system as claimed in claim 1, wherein the needed codes are parametric design language codes of the ANSYS.

3. The system as claimed in claim 1, wherein the second format is an American standard code for information interchange (ASCII).

4. A method for reformatting a motherboard design file, the method comprising the steps of:
 converting the motherboard design file from a first format to a second format, and generating a converted temp file based on the motherboard design file;
 selecting information classes of the converted temp file, wherein the information classes comprise thickness information of each layer, information of pads, etching information of circuits, information of components, and linkage definition information of components;
 parsing contents from the converted temp file according to the information classes;
 data checking thickness of each layer according to thickness information of each layer;
 data checking circuit configuration of the motherboard according to information of pads and etching information of circuits;
 encoding needed codes according to thickness of each layer and circuit configuration of the multilayer motherboard, and generating the motherboard design file based on the needed codes;

data checking via configuration and anti-pad configuration according to information of components and linkage definition information of components; and configuring a model to simulate vias and the connection correlations between vias and each layer according to via configuration and anti-pad configuration.

5. The method as claimed in claim 4, wherein the needed codes are parametric design language codes of the ANSYS.

6. The method as claimed in claim 4, wherein the second format is an American standard code for information interchange (ASCII).

* * * * *